(12) United States Patent  
Szwedowicz et al.

(10) Patent No.: US 8,569,928 B2  
(45) Date of Patent: Oct. 29, 2013

(54) METHOD FOR INFLUENCING, DAMPING, OR SUPPRESSING MECHANICAL VIBRATIONS OCCURRING DURING OPERATION IN A TURBOMACHINE BLADE, A TURBOMACHINE BLADE USEFUL FOR CARRYING OUT THE METHOD, AND A PIEZOELECTRIC DAMPING ELEMENT

(75) Inventors: Jaroslaw Leszek Szwedowicz, Bad Zurzach (CH); Wolfgang Kappis, Fislisbach (CH); Lars Panning, Hannover (DE); Sebastian Marc Schwarzendahl, Hannover (DE); Marcus Neubauer, Hannover (DE); Andreas Hohl, Hannover (DE); Jörg Wallaschek, Paderborn (DE)

(73) Assignee: ALSTOM Technology Ltd., Baden (CH)

( * ) Notice: Subject to any disclaimer, the term of this patent is extended or adjusted under 35 U.S.C. 154(b) by 109 days.

(21) Appl. No.: 13/298,726

(22) Filed: Nov. 17, 2011

(65) Prior Publication Data

US 2012/0126665 A1    May 24, 2012

(30) Foreign Application Priority Data

Nov. 24, 2010   (CH) ........................................ 1966/10

(51) Int. Cl.  
*H01L 41/08*   (2006.01)

(52) U.S. Cl.  
USPC ......................................... 310/321; 310/326

(58) Field of Classification Search  
USPC .......................................... 310/326, 327, 328  
See application file for complete search history.

(56) References Cited

U.S. PATENT DOCUMENTS

| 4,849,668 | A | * | 7/1989 | Crawley et al. | 310/328 |
| 5,032,753 | A | * | 7/1991 | Yamaguchi et al. | 310/317 |
| 5,140,529 | A | * | 8/1992 | Peifer | 700/280 |
| 6,138,996 | A | * | 10/2000 | Hayashi et al. | 267/136 |
| 6,563,250 | B2 | * | 5/2003 | Mathur | 310/316.01 |
| 7,360,996 | B2 | * | 4/2008 | Driver | 416/226 |
| 7,564,163 | B2 | * | 7/2009 | Onoda et al. | 310/316.01 |
| 2003/0209953 | A1 | * | 11/2003 | Park | 310/317 |
| 2007/0128025 | A1 | * | 6/2007 | Driver | 416/23 |
| 2008/0202664 | A1 |   | 8/2008 | Pletner et al. | |

FOREIGN PATENT DOCUMENTS

| EP | 0214393 | 3/1987 |
| EP | 0727564 | 8/1996 |
| EP | 1170524 | 1/2002 |
| EP | 1422440 | 5/2004 |
| EP | 1538304 | 6/2005 |

(Continued)

OTHER PUBLICATIONS

Search Report for Swiss Patent App. No. 1966/2010 (Mar. 18, 2011).

*Primary Examiner* — Mark Budd  
(74) *Attorney, Agent, or Firm* — Cermak Nakajima LLP; Adam J. Cermak (57) ABSTRACT

In a method for influencing, in particular damping or suppressing, mechanical vibrations occurring during operation in a turbomachine blade (10), the mechanical vibratory energy of the turbomachine blade (10) is first converted into electrical energy and the electrical energy generated is then converted into heat loss. Effective damping which can be used especially simply and in a versatile way is achieved in that the piezoelectric effect is used in order to convert mechanical vibratory energy into electrical energy.

19 Claims, 4 Drawing Sheets

(56) References Cited

FOREIGN PATENT DOCUMENTS

| | | |
|---|---|---|
| JP | 8-61295 | 3/1996 |
| JP | 2003138904 | 5/2003 |
| JP | 2003138910 | 5/2003 |
| KR | 20040008850 | 1/2004 |
| WO | WO2006/121570 | 11/2006 |

* cited by examiner

METHOD FOR INFLUENCING, DAMPING, OR SUPPRESSING MECHANICAL VIBRATIONS OCCURRING DURING OPERATION IN A TURBOMACHINE BLADE, A TURBOMACHINE BLADE USEFUL FOR CARRYING OUT THE METHOD, AND A PIEZOELECTRIC DAMPING ELEMENT

This application claims priority under 35 U.S.C. §119 to Swiss application number 01966/10, filed 24 Nov. 2010, the entirety of which is incorporated by reference herein.

BACKGROUND

1. Field of Endeavor

The present invention relates to the field of turbo-machines, such as, for example, wind turbines, steam turbines, gas turbines, and compressors. It relates to a method for influencing, in particular damping or suppressing, mechanical vibrations occurring during operation in a turbomachine blade. It also relates to a turbomachine blade useful for carrying out the method and to a piezoelectric damping element to be installed in such a turbomachine blade.

2. Brief Description of the Related Art

When turbines (or compressors) are in operation, asynchronous and synchronous blade vibrations may be generated due to aerodynamic effects (for example, fluttering) or to mechanical effects (for example, on account of the friction of the blades against the casing). Resonances in the blade may lead to problems of vibratory crack formation ("high-cycle fatigue" HCF) which constitutes a critical type of failure for turbine and compressor blades.

In order to protect turbomachine blades against such HCF faults, the blade leaves are coupled to integral shroud elements or winglets which increase the rigidity of the blade arrangement of a turbine stage and damp or suppress vibrations due to friction between the adjacent blades. Arrangements of this type are known, for example, from the publication EP 0 214 393 A1 or U.S. Pat. No. 3,752,599.

If the turbine concept requires free-standing blades, friction-generating devices may be arranged on the blades beneath the platforms or between the blades as friction pins or may be accommodated inside the blades. Such solutions are known, for example, from the publication EP 1 538 304 A2 or U.S. Pat. Nos. 4,460,314 and 6,979,180 B2.

The damping effect of such friction-generating devices and frictional couplings depends, however, upon the optimal normal force and rigidity of the coupling contact which have to be coordinated suitably with the relevant resonant frequency (to be damped). In other words, frictional damping can be used effectively only for a specific vibratory frequency of the blade, whereas other frequencies are damped inadequately or not at all.

Frictional dampers are highly dependent upon amplitude, and any variation in rigidity or in the mass system involved on account of abrasion or other modifying processes in the system results in changed resonant frequencies which are detrimental to the effectiveness of frictional dampers.

However, it has already been proposed (see, for example, the publication EP 0 727 564 A1), to damp vibrations of turbine blades in that, as a result of the interaction of permanent magnets with the blades, eddy currents are generated which are converted into heat loss. The range of use of such solutions is narrowly limited, however, because interaction is restricted to the region between the blade tip and the opposite casing wall. Vibrations occurring inside the blade leaf therefore cannot be effectively damped.

Furthermore, it is known (see, for example, the publication JP 2003138904), for actively controlling frictional coupling between adjacent turbine blades, to insert in the blades piezoelectric elements by which frictional contact during operation can be optimized and readjusted. This solution is not suitable for free-standing blades. However, piezoelectric elements of this type may also be used in order to measure and monitor the contact pressure of such frictional couplings (JP 2003138910).

Overall, the friction-based damping systems are complicated in terms of setup and use and can be frequency-tuned only with difficulty, while the principle based on the generation of eddy currents can be used to only a very limited extent.

SUMMARY

One of numerous aspects of the present invention includes a method of the aforementioned type which can avoid disadvantages of known methods and can be distinguished by simple and very broad applicability.

Another aspect includes a turbomachine blade useful for carrying out the method.

Yet another aspect includes a piezoelectric damping element to be installed in a turbomachine blade.

Another aspect includes influencing, in particular damping or suppressing, mechanical vibrations occurring during operation in a turbomachine blade. Mechanical vibratory energy of the turbomachine blade is first converted into electrical energy and the electrical energy generated is then converted into heat loss. Methods embodying principles of the present invention can be distinguished in that the piezoelectric effect is used in order to convert mechanical vibratory energy into electrical energy.

A refinement can include that, in order to convert mechanical vibratory energy into electrical energy, at least one piezoelectric damping element is installed firmly in the turbomachine blade to be damped, the damping element being deformed as a result of the mechanical vibrations of the turbomachine blade and generating an electrical voltage, and ohmic heat loss is produced by the generated electrical voltage in a connected electrical network.

In particular, the electrical network includes as a shunt a series connection composed of an inductance and of an ohmic resistance, the piezoelectric damping element including in the manner of a capacitance, a piezo body arranged between electrodes, and the resonant frequency of the resulting oscillatory circuit being tuned to the mechanical vibration, to be damped, of the turbomachine blade.

Furthermore, it is advantageous if the electrical oscillations in the piezoelectric damping element are measured and evaluated in order to determine and monitor the mechanical vibrations in the turbomachine blade.

Another refinement includes that a cavity is introduced into the turbomachine blade in order to install the piezoelectric damping element, and in that the piezoelectric damping element is inserted into the cavity and is firmly coupled there to the turbomachine blade, in particular by materially integral connection or mechanical bracing.

Turbomachine blades embodying principles of the present invention can be characterized in that at least one piezoelectric damping element is firmly installed in the turbomachine blade.

A refinement includes that the at least one piezoelectric damping element is designed as a piezo element which is connected to an electrical network and, in particular, is damped electrically by a shunt containing an ohmic resistance.

In particular, the electrical network or the shunt includes a series connection composed of the ohmic resistance and of an inductance.

In this case, the electrical network or the shunt may preferably include a coil.

According to another refinement, the piezo element includes a stack of piezo bodies and electrodes.

Another refinement includes that the turbomachine blade has formed in it a cavity in which the at least one piezoelectric damping element is accommodated.

In particular, the at least one piezoelectric damping element is surrounded by a dedicated casing which is preferably composed of an upper and a lower subcasing.

According to another refinement, the at least one piezoelectric damping element is firmly coupled to the turbomachine blade, in particular by materially integral connection or mechanical bracing.

A further refinement is characterized in that a plurality of piezoelectric damping elements are arranged in the turbomachine blade so as to be distributed over said turbomachine blade.

Yet another refinement is distinguished in that the at least one piezoelectric damping element is connected wirelessly to a measuring device for receiving and evaluating the signals occurring at the piezoelectric damping element.

A piezoelectric damping element to be installed in a turbomachine blade is characterized in that the piezoelectric damping element is designed as a piezo element which is connected to an electrical network and, in particular, is damped electrically by a shunt containing an ohmic resistance.

A refinement of the piezoelectric damping element is characterized in that the piezo element includes a stack of piezo bodies and electrodes.

Another refinement is characterized in that the electrical network or the shunt includes a series connection composed of the ohmic resistance and of an inductance.

In particular, the electrical network or the shunt includes a coil which may have any desired form.

According to another refinement, the piezoelectric damping element is surrounded by a casing which is preferably composed of an upper and of a lower subcasing.

Finally, a time-variable resistance may be provided in the electrical network.

BRIEF DESCRIPTION OF THE DRAWINGS

The invention will be explained in more detail below by reference to exemplary embodiments, in connection with the drawings, in which.

DETAILED DESCRIPTION OF EXEMPLARY EMBODIMENTS

Figure 5:
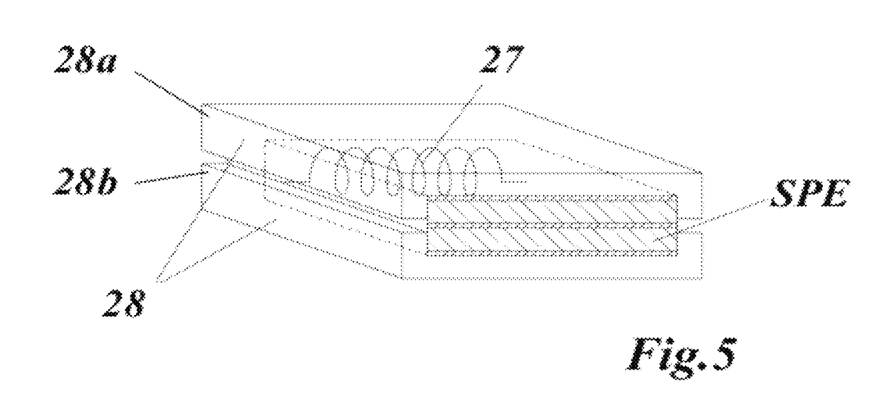
FIG. 5 shows a perspective view of a piezoelectric damping element according to FIG. 3, including a coil in the shunt, said damping element being accommodated in a two-part casing.

Principles of the present invention are based primarily on the piezoelectric effect. The piezoelectric effect is the ability of a material to form an electrical charge when it is acted upon by external forces, that is to say, ultimately, to convert mechanical energy into electrical energy. If the locations at which the voltage generated occurs are connected to an electrical network with ohmic resistance, part of the electrical energy generated can be converted into heat loss. So that energy does not have to be fed into the rotating turbomachine blades or turbine blades from outside, the electrical network, which forms a shunt, should be of passive design. A passive network which is especially effective in damping terms is composed of an inductance L in series with an electrical resistance R (see the shunt 21 in FIG. 2). Such a shunt is often designated as an "LR shunt" and may generally include the most diverse possible combinations of inductances L and resistances R in a series and/or parallel connection, self-supplied switching networks (of the type "self-powered synchronized switch damping on inductor" (SSDI)) and the like. It is also conceivable, however, to use active solutions with negative capacitance, or, in general, to provide a time-variable resistance in the network.

Figure 2:
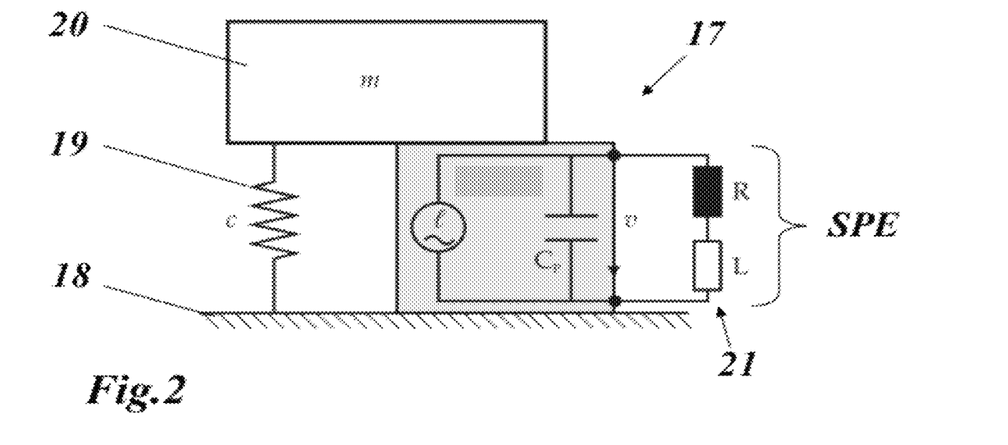
FIG. 2 shows an equivalent circuit diagram of an installed piezo element with shunt, with one mechanical degree of freedom.

FIG. 2 shows an equivalent circuit diagram 17 of a piezoelectric damping element SPE installed with one mechanical degree of freedom (perpendicularly to the reference plane) and having a shunt 21. The piezoelectric damping element SPE lies between a reference plane 18 and a mass 20 of size m which is coupled resiliently to the reference plane 18 (spring 19 with spring constant c). The piezo element (gray box in FIG. 2), provided with electrodes on opposite surfaces, may be considered in electrical terms as a capacitance of size $C_p$ which lies parallel to an internal voltage source I and at which a voltage v is present on the outside under mechanical load. If the piezo element is provided with a shunt 21 having a series connection composed of a resistance R and inductance L (see the coil 27 in FIG. 5), an oscillatory circuit is obtained which behaves in the same way as a frequency-tuned vibration damper. In a similar way to a tuned vibration damper, the oscillatory circuit has to be tuned to the oscillations of the system 18, 19, 20, in order to have a damping action. However, the oscillatory circuit may also retroact in the manner of an absorber upon the blade and its vibrations and may oscillate with an independent frequency which is then damped to a greater or lesser extent.

Figure 1:
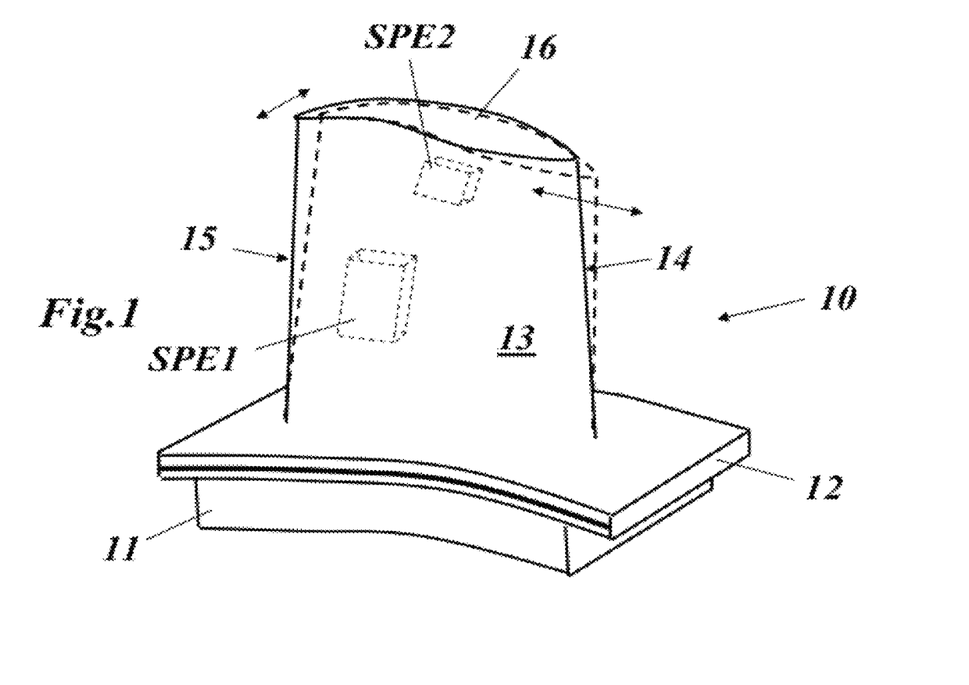
FIG. 1 shows a perspective view of an exemplary turbine blade with piezoelectric damping elements arranged inside it, according to an exemplary embodiment of the invention.

When, according to FIG. 1, such piezoelectric damping elements SPE1, SPE2 are installed inside a turbine blade 10 which, in the example illustrated, includes a blade root 11, a platform 12, a blade leaf 13 with a leading edge 14 and trailing edge 15, and a blade tip 16 which vibrates in the way indicated by the double arrows, the vibrations of the turbine blade 10 generate in the piezo element deformations which charge the capacitance $C_p$ of the piezoelectric damping element SPE with a corresponding voltage. The shunt 21 then converts the vibratory energy of the blade into lost energy as a function of the predefined parameters and of the position of the damping element on the vibrating blade.

The advantage of such a piezoelectric damping element SPE is that damping is independent of the normal force and the rigidity of mechanical contact which play an essential part in frictional damping. Furthermore, the damping action in this arrangement can be set for more than one resonant frequency of the blade, in that, for example, a plurality of LR shunts with correspondingly different parameters are provided. However, a plurality of piezoelectric damping elements may also be connected to one another by a common electrical network.

As compared with the conventional friction damper, the piezoelectric damping element has the advantage, furthermore, that its action is independent of phase shifts and magnitudes of the vibration amplitudes of adjacent blades at the resonant frequency. Also the damping action of the piezoelectric damping element can easily be adapted to another resonant frequency simply by varying the electrical connection. Thus, for example, if there is appropriate access to the inside of the blade, the parameters of the shunt 21 can be varied at a later stage by laser beam (for example by changing the geometry of a resistance path) or the like.

Furthermore, as compared with the conventional friction damper, there is the technical advantage that, by using the proposed damper, the resonant frequency of the undisturbed blade is shifted toward another value to a lesser extent, this being an important criterion in the design of the turbine. Also, the piezoelectric damper does away with problems of abrasion which have to be taken into account in frictional damping.

A piezoelectric damping element embodying principles of the present invention may be used, for example, for turbine and compressor blades of steam-, gas- and wind-powered machines. The piezoelectric damping element is preferably installed in a cavity in the blade or in the associated blade carrier. The configuration and location of the cavity may in this case be selected optimally in a largely independent way.

Figure 3:
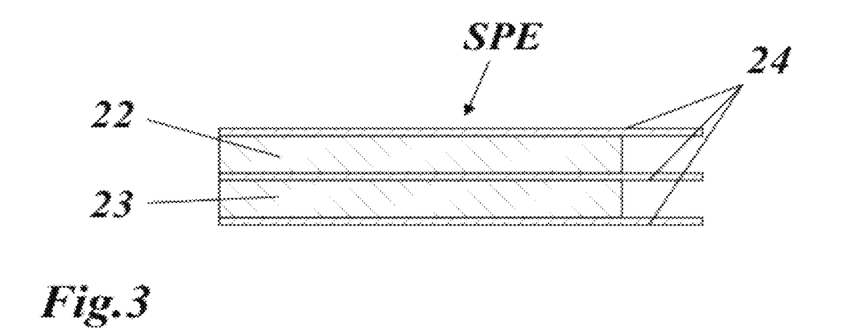
FIG. 3 shows a sectional view of an exemplary embodiment of a piezoelectric damping element according to principles of the invention.

An exemplary embodiment of a piezoelectric damping element according to principles of the invention is illustrated in sections in FIG. 3. The piezoelectric damping element SPE of FIG. 3 is constructed as a stack from two sheet-like, disk-shaped piezo bodies 22 and 23 which are composed of a material suitable for the piezoelectric effect and the operating temperature of the turbine and which alternate in the stack with contact elements or electrodes 24. The choice of material and connection technique for the elements 22-24 are basically known to a person skilled in the art.

Figure 4:
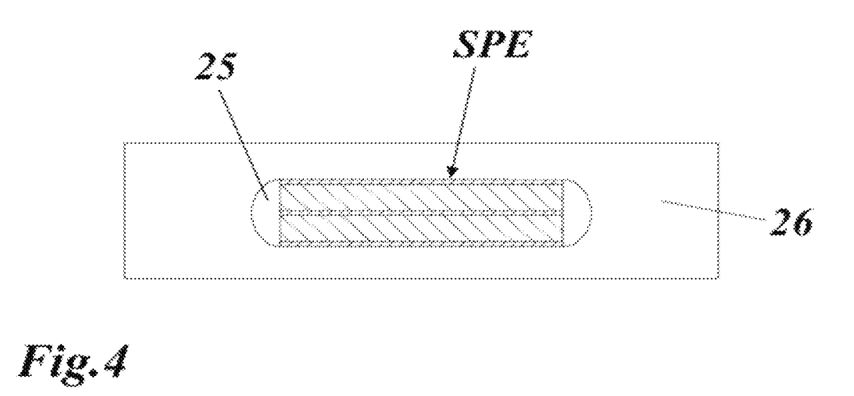
FIG. 4 shows an example of the installation of a piezoelectric damping element according to FIG. 3 in a turbine blade.

The piezoelectric damping element SPE of FIG. 3 may, according to FIG. 4, be installed directly in a cavity 25 provided for it inside a blade 26 or may be assembled there. The opposite outsides of the piezoelectric damping element SPE are coupled firmly to the inner walls of the cavity 25. This may take place in various ways, such as for example, by adhesive bonding, soldering or mechanical clamping, based on friction or thermal expansion. After the element has been installed, the cavity 25 can be protected by a cover which is connected to the margin of the cavity 25, for example, by soldering or welding. After closing, the surface of the arrangement can be re-machined in order to fulfill aerodynamic requirements demanded of the blade. It is also conceivable, however, to fill up or grout the cavity 25 with the installed piezoelectric damping element SPE with a material which solidifies, for example, as a result of the action of heat and forms a fixed unit with the element and the blade.

Figure 6:
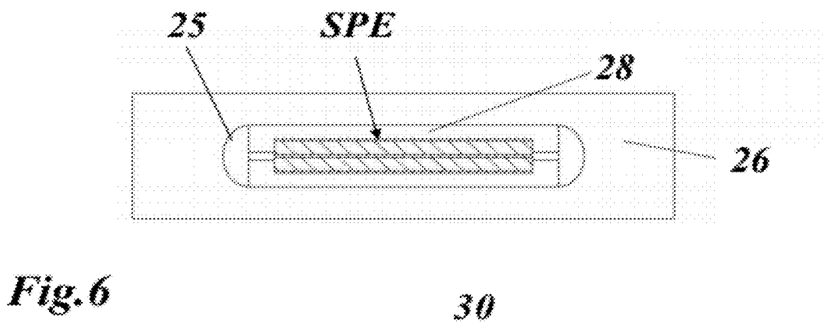
FIG. 6 shows an example of the installation of the element from FIG. 5 in a turbine blade, comparable to FIG. 4.

In addition to the direct installation of the piezoelectric damping element SPE in the cavity 25 of the blade 26 according to FIG. 4, however, it is also possible to insert the piezoelectric damping element SPE according to FIG. 5 first between an upper subcasing 28a and a lower subcasing 28b which are composed of a metal or of another material suitable for the application and which together form a casing 28. According to FIG. 6, the piezoelectric damping element SPE, together with its casing 28, can then be installed in the cavity 25 of the blade 26. By a suitable choice of material for the casing 28, if appropriate, connection techniques other than when the piezoelectric damping element SPE is installed directly without the casing may be used for connection between the casing 28 and blade 26.

The outer contour of the casing 28 can be adapted exactly to the outer profile of the turbine blade, so that re-machining is unnecessary in this case. An adapted contour of this type may be produced, for example, by selective laser melting (SLM) according to the three-dimensionally sensed geometry of the corresponding turbine blade. The use of other rapid manufacturing techniques may likewise be envisaged.

Figure 7:
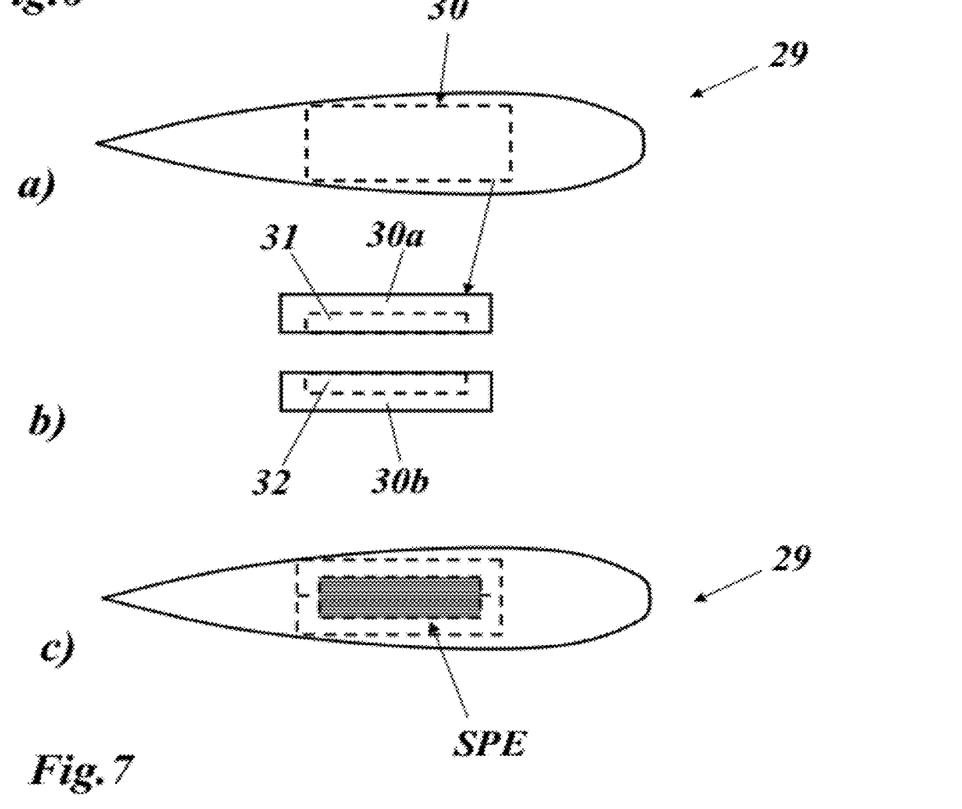
FIG. 7 shows several sub-figures (a) to (c) of various steps in the installation of a piezo-electric damping element in a turbine blade according to an exemplary embodiment of the invention.

Another possibility is, according to FIG. 7, to cut out a cutout 30 from the turbine blade 29 locally at the place of use (FIG. 7(a)), then to divide this cutout 30 into an upper part 30a and a lower part 30b (FIG. 7(b)), to introduce a recess 31 or 32 in each case into the two parts 30a, b and then to use the two parts as subcasings (as in FIGS. 5 and 6) for a piezoelectric damping element SPE. The arrangement composed of the piezoelectric damping element SPE and of the casing (30a, b) is then installed in the blade 29 again (FIG. 7(c)).

Here, too, various techniques for the firm connection between the casing (30a, b) having the piezoelectric damping element SPE located in it and the turbine blade may again be used. For example, a brazing process may be employed. In this process, the brazing alloy is heated to a melting temperature of above 450° C., so that it is then distributed between the casing (30a, b) and the turbine blade 29. It is important in this case that the piezoelectric damping element is not heated to above its Curie temperature, because otherwise it loses its piezoelectric properties.

The position of the piezoelectric damping element SPE is defined with regard to as high a damping as possible of the respective vibrations of the turbine blade, thus it is important that the useful life of the blade, overall, is not reduced. In particular, as illustrated in FIG. 1, a plurality of piezoelectric damping elements SPE1, SPE2 may be arranged at various locations in the turbine blade 10 if corresponding expansions occur there.

In practice, all the blades of a turbine stage (rotor disk) may be equipped with piezoelectric damping elements SPE. It is also conceivable however, to equip only selected blades or blade leaves of a turbine stage with such elements. Selection may in this case take place on the basis of a predetermined deliberate detuning pattern or measured detuning pattern in an existing turbine stage. If desired, piezoelectric damping elements which are arranged on various turbine blades of a turbine stage may be connected to one another in an (electrical) network, in order to intensify and optimize the damping effect in the turbine stage.

The permissible operating temperature and other load variables are determined or limited solely by the choice of piezo material and connection technique. Piezoelectric materials having a high Curie temperature are obtainable. For use in turbomachines, for example, barium titanate is a good choice, this having a high operating temperature of approximately 500° C. Unfortunately, however, barium titanate has a comparatively low piezoelectric modulus and low permittivity. Lead metaniobate is therefore to be preferred up to temperatures of 350° C. Materials of the PZT type (lead-zirconate-titanate) have the highest piezoelectric modulus, but can be used only up to temperatures of 180° C.

It is furthermore conceivable to use the proposed piezoelectric damping elements together with conventional friction dampers, in order to optimize overall damping in the blade.

Figure 8:
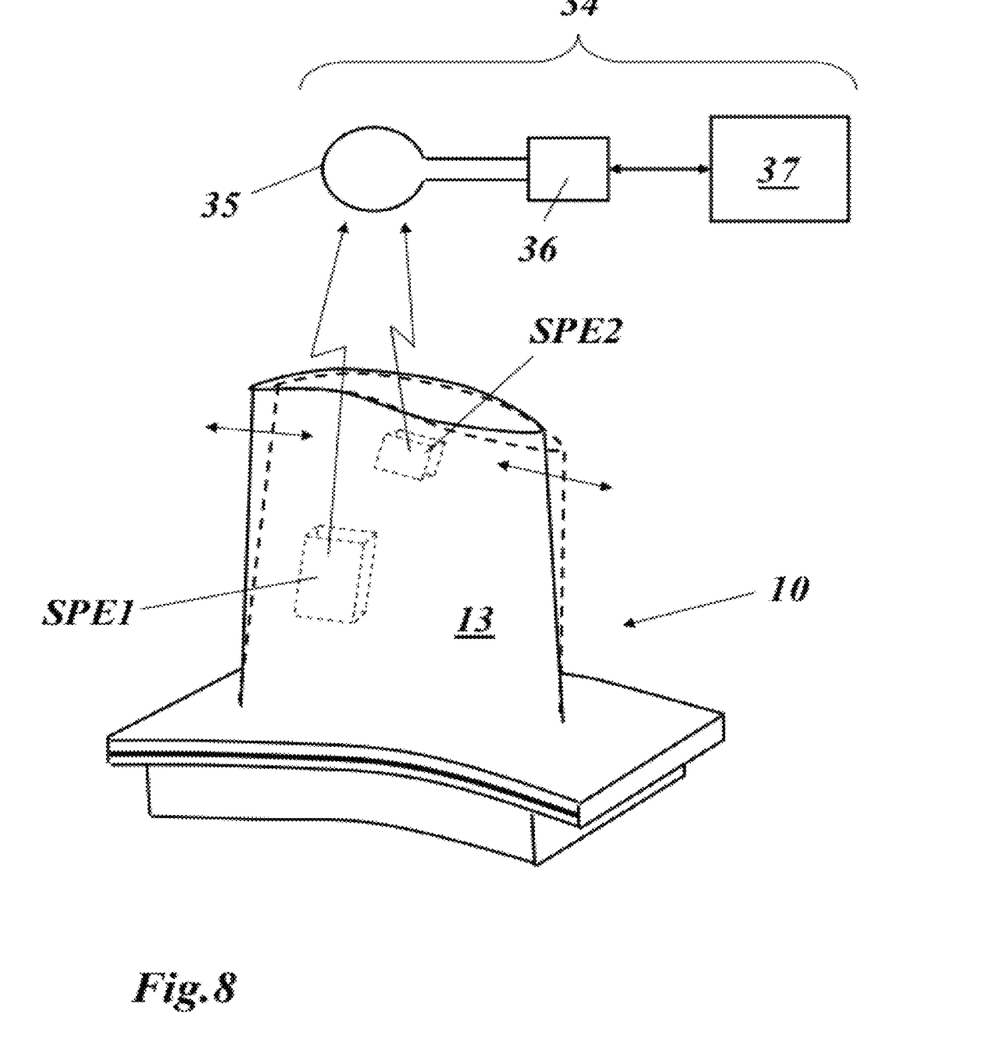
FIG. 8 shows a basic arrangement for the transmission and evaluation of signals from piezoelectric damping elements installed in a turbine blade.

Moreover, it is possible, according to FIG. 8, to use the piezoelectric damping elements SPE at the same time as sensors for measuring the blade vibrations. The measured signals can be transmitted wirelessly (telemetrically) from the rotating turbine to a stationary measuring device 34 which is equipped with a (reception) antenna 35, with a signal receiver 36 and with an evaluation unit 37. The data obtained can be used for monitoring the turbine, in particular its vibration behavior. The two functions of damping and vibration measurement may in this case be performed simultaneously in the system.

The described use of piezoelectric damping elements SPE may be extended to various components of gas turbines, steam turbines and compressors in aviation, in shipping, in industry and in large engines, insofar as the operating temperature does not overshoot the Curie temperature of the piezoelectric material used.

LIST OF REFERENCE SYMBOLS

10 Turbine blade
11 Blade root
12 Platform
13 Blade leaf
14 Leading edge
15 Trailing edge
16 Blade tip
17 Equivalent circuit diagram
18 Reference plane
19 Spring
20 Mass
21 Shunt
22, 23 Piezo body
24 Contact element (electrode)
25 Cavity
26, 29 Turbine blade
27 Coil (inductance)
28 Casing
28a, b Subcasing
30 Cutout
30a Upper part
30b Lower part
31, 32 Recess
34 Measuring device
35 Antenna
36 Signal receiver
37 Evaluation unit
SPE Piezoelectric damping element
SPE1,2 Piezoelectric damping element While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for suppressing mechanical vibrations occurring during operation in a turbomachine blade, the method comprising:
    forming a cavity in the turbomachine blade configured and arranged to receive at least one piezoelectric damping element;
    installing at least one piezoelectric damping element firmly in the turbomachine blade, including inserting the at least one piezoelectric damping element into the cavity and firmly coupling the piezoelectric damping element to the turbomachine blade;
    converting mechanical vibratory energy of the turbomachine blade into electrical energy;
    piezoelectrically converting said electrical energy into heat loss, wherein piezoelectrically converting comprises deforming said at least one piezoelectric damping element as a result of the mechanical vibrations of the turbomachine blade and generating an electrical voltage; and
    wherein converting said electrical energy comprises ohmically losing heat from the generated electrical voltage in a connected electrical network.

2. The method as claimed in claim 1, wherein:
    said electrical network comprises a shunt including a series connection of an inductance and an ohmic resistance;
    the piezoelectric damping element comprises a capacitance including a piezo body arranged between electrodes; and
    further comprising tuning a resonant frequency of an oscillatory circuit formed by said electrical network to a mechanical vibration to be damped of the turbomachine blade.

3. The method as claimed in claim 2, further comprising:
    measuring and evaluating electrical oscillations in the piezoelectric damping element to determine and monitor the mechanical vibrations in the turbomachine blade.

4. The method as claimed in claim 1, wherein coupling comprises forming a materially integral connection or mechanical bracing.

5. The method as claimed in claim 1, wherein the turbomachine blade comprises a turbine blade.

6. A turbomachine blade comprising:
    a blade leaf;
    a cavity in the blade leaf;
    at least one piezoelectric damping element installed firmly in the blade leaf;
    wherein the at least one piezoelectric damping element is positioned in said cavity.

7. The turbomachine blade as claimed in claim 6, wherein said blade comprises a turbine blade.

8. The turbomachine blade as claimed in claim 6, wherein the at least one piezoelectric damping element comprises a piezo element and an electrical network connected to the piezo element.

9. The turbomachine blade as claimed in claim 8, wherein the electrical network comprises a shunt containing an ohmic resistance connected to electrically dampen the piezo element.

10. The turbomachine blade as claimed in claim 9, wherein the electrical network or the shunt comprises a series connection comprising said ohmic resistance and an inductance.

11. The turbomachine blade as claimed in claim 9, wherein the electrical network or the shunt comprises a coil.

12. The turbomachine blade as claimed in claim 8, wherein the piezo element comprises a stack of piezo bodies and electrodes.

13. The turbomachine blade as claimed in claim 6, further comprising:
- a dedicated casing surrounding the at least one piezoelectric damping element.

14. The turbomachine blade as claimed in claim 13, wherein the dedicated casing comprises an upper subcasing and a lower subcasing.

15. The turbomachine blade as claimed in claim 6, wherein the at least one piezoelectric damping element is firmly coupled to the blade leaf.

16. The turbomachine blade as claimed in claim 6, wherein the at least one piezoelectric damping element is coupled to the blade leaf with a materially integral connection or by mechanical bracing.

17. The turbomachine blade as claimed in claim 6, wherein the at least one piezoelectric damping element comprises a plurality of piezoelectric damping elements arranged in and distributed over the blade leaf.

18. The turbomachine blade as claimed in claim 6, further comprising:
- a measuring device configured and arranged to receive and evaluate signals occurring at the piezoelectric damping element;
- wherein the at least one piezoelectric damping element is wirelessly connected to the measuring device.

19. The turbomachine blade as claimed in claim 8, wherein the electrical network comprises a time-variable resistance.

* * * * *